United States Patent
Mendolia

[11] Patent Number: 6,044,152
[45] Date of Patent: Mar. 28, 2000

[54] SHIELDED KEYBOARD FOR A PORTABLE COMMUNICATION DEVICE

[75] Inventor: Samuel V. Mendolia, Lynchburg, Va.

[73] Assignee: Ericsson Inc., Research Triangle Park, N.C.

[21] Appl. No.: 09/007,583

[22] Filed: Jan. 15, 1998

[51] Int. Cl.$^7$ ...................................................... H04M 1/00
[52] U.S. Cl. .......................................... 379/433; 379/368
[58] Field of Search ..................................... 379/433, 428, 379/368, 369, 370; 455/575, 90; 361/816, 796, 818, 800

[56] References Cited

U.S. PATENT DOCUMENTS

| | | | |
|---|---|---|---|
| 5,153,590 | 10/1992 | Charlier | 341/31 |
| 5,266,949 | 11/1993 | Rossi | 341/22 |
| 5,271,056 | 12/1993 | Pesola et al. | 379/58 |
| 5,274,693 | 12/1993 | Waldman | 379/59 |
| 5,365,570 | 11/1994 | Boubelik | 379/59 |
| 5,402,481 | 3/1995 | Waldman | 379/355 |
| 5,438,482 | 8/1995 | Nakamura et al. | 361/816 |
| 5,514,319 | 5/1996 | Young | 264/132 |
| 5,572,571 | 11/1996 | Shirai | 379/58 |
| 5,584,546 | 12/1996 | Gurin et al. | 312/200 |
| 5,588,041 | 12/1996 | Meyer et al. | 379/59 |
| 5,661,793 | 8/1997 | Tanji et al. | 379/368 |

*Primary Examiner*—Jack Chiang
*Attorney, Agent, or Firm*—Brinks Hofer Gilson & Lione

[57] ABSTRACT

The present invention provides an improved keyboard for a cellular telephone or the like. The improved keyboard includes an additional shielding layer which is added to the keypad to prevent RF leakage in the direction of the user. The shielding layer includes an insulating layer and a conductive layer. The conductive layer may be added in one of two ways. First, a conductive layer made of nickel foil or other suitable material may be molded directly into the keypad. Second, the conductive layer may be plated or painted on the surface of the keypad. In any such process, a layer of insulating material is added to the bottom surface of the conductive layer to prevent shorts. Finally, doping of the keypad may be used to improve the effectiveness of the shielding by using it with either of the aforementioned methods of implementation.

13 Claims, 1 Drawing Sheet

SHIELDED KEYBOARD FOR A PORTABLE COMMUNICATION DEVICE

FIELD OF THE INVENTION

The present invention relates to a keyboard for a portable communication device such as a cellular telephone or the like; more specifically, a keyboard utilizing an additional shielding layer added to the keypad to block radio frequency (RF) leakage emanating from within the device.

BACKGROUND

One problem with present portable communication devices such as cellular telephones is that construction of the phone is such that there is RF leakage through the keyboard which is directed towards the face of the user. Present keyboards offer little or no shielding to prevent such RF leakage. If the RF shielding is insufficient, especially in smaller phones having less physical space for shielding, manufacturers will typically set the transmitter power levels lower than normal to reduce emissions in order to pass FCC standards. Accordingly, lower transmission power levels results in reduced range of the phone.

For those cellular phones which have shielding, one current shielding method includes plating or painting. Unfortunately, plating or painting creates a myriad of problems. First, cosmetic defects are created due to overplating, often visible around the perimeter of the buttons. Plating provides no shielding at the keyhole openings, and plated fronts are often rejected due to non-uniform coating. Finally, masking is usually required for plated shielding, a process which is labor-intensive and less than cost efficient.

The use of shield cans also creates problems. Shield cans which are soldered are costly to assemble, inspect, troubleshoot, and repair. The use of shield cans is a limiting factor as to the overall size of the phone. They consume an inordinate amount of precious board space because they must contact the printed circuit board (PCB). Shield cans add more weight to the phone than other shielding processes. Finally, they inhibit the air circulation within the phone which can ultimately cause damage to temperature sensitive components.

SUMMARY

The present invention provides an improved keyboard for a cellular telephone which addresses the above-mentioned problems. The improved keyboard includes an additional shielding layer to the keypad to prevent RF leakage. The shielding layer includes an insulating layer and a conductive layer. The conductive layer may be added to the keyboard in one of two ways. First, a conductive layer made of nickel foil or other suitable material may be molded directly into the keypad using a conventional molding technique. Second, the conductive layer may be plated or painted, using processes well known in the art. In any such process, the bottom surface of the conductive layer is covered with a layer of insulating material is added to prevent shorts. However, a small portion of the conductive layer may be in direct contact with the printed circuit board for grounding which ultimately improves the shielding. Furthermore, doping the keypad during its fabrication may be used to improve the effectiveness of the shielding by using it with either of the aforementioned methods.

It is therefore an object of the present invention to provide a shielded keyboard which utilizes an additional layer of shielding to block RF leakage.

It is further an object of the present invention to provide a shielded keyboard which further reduces RF leakage by doping the keypad with metal particles.

It is still further an object of the present invention to provide a shielded keyboard which avoids cosmetic defects, avoids leakage around keyhole openings, and avoids the plating or painting processes.

Additional advantages and features of the present invention will become apparent from reading the detailed description of the preferred embodiments which make reference to the following set of drawings.

DETAILED DESCRIPTION

Figure 1:
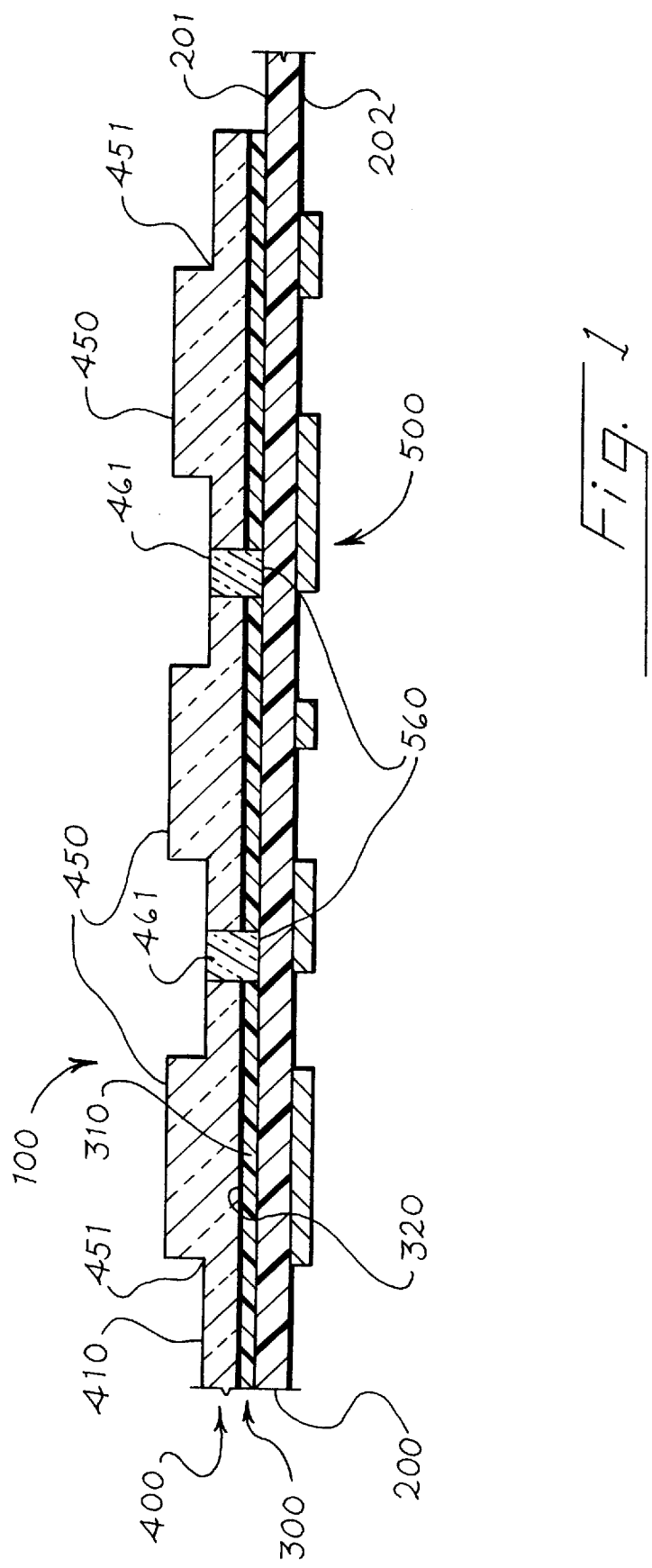
FIG. 1 is a partial cross sectional view of the preferred embodiment of the present invention.

The present invention includes an improved keyboard 100 for a portable communication device such as a cellular telephone (not shown) or other keyboard device which requires increased shielding from radio frequency (RF) emissions. Referring now to FIG. 1, the improved keyboard 100 includes a printed circuit board (PCB) 200, shielding 300, a keypad 400, and various electrical components 500.

The PCB 200 provides a foundation for the improved keyboard 100. The PCB 200 is a substrate of conventional construction having a primary side 201 and a secondary side 202. The primary side 201 and the secondary side 202 both contain electrical components thereon; those components on the primary side (not shown) and those components 500 on the secondary side.

The shielding 300 adjoins the top surface of the PCB 200 as shown in FIG. 1. The shielding 300 includes an insulating layer 310 made from a thin layer of rubber, flexible plastic or any suitable insulating material and adjoins the top surface of the PCB 200. The insulating layer 310 prevents shorts from occurring. The shielding 300 also includes a conductive layer 320 made from nickel foil or equivalent which adjoins the top surface of the insulating layer 310. The conductive layer 320 serves a dual purpose. First, it blocks RF signals emanating from within the cellular phone (not shown) from reaching the user. Second, it provides a shiny surface which reflects the light from the LED's 560 up through the buttons 450 which increases the magnitude of light seen by the user. Furthermore, a small opening (not shown) may be made in the insulating layer 310 such that the conductive layer 320 comes into direct contact with the surface of the PCB 200 for grounding purposes.

The keypad 400 includes a base 410 and buttons 450. The base 410, which is made of a material resistant to stains, scratches, etc. such as rubber or flexible plastic, provides an outer layer for the keyboard 100. In the preferred embodiment of the present invention, the keypad base 410 is doped with a metal such as magnesium or the like. That is, the material from which the base 410 is fabricated is impregnated with metal particles (not shown) during the manufacturing process. Such doping of the base 410 provides it with an absorptive quality which further reduces the RF leakage through the keyboard 100, especially at high frequencies. The buttons 450 are typically formed integrally with the base 410, but may, in the alternative, be distinct components which slidably protrude through keypad openings (not shown). The buttons 450 are translucent in nature such that the light from the LED's 560 may pass through the buttons 450 to the eye of the user. The LED's 560 are off-the-shelf items and are positioned on the PCB 200 fitting within openings 461 in the keypad 400. Furthermore, the light generated by the LED's 560 is reflected off the shiny top surface of the conductive layer 320 and through the translucent buttons 450, thus increasing the brightness of the buttons 450 as observed by the user of the cellular phone (not shown).

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed:

1. A portable telecommunication device, comprising:
   a nonconducting substrate supporting electrically conducting regions and electrical components forming electrical circuits;
   a base shielding layer having an optically reflective top surface made of radio frequency shielding material and an insulating bottom surface disposed against said substrate;
   a keypad assembly overlying said base shielding layer and having optically translucent keypads and a keypad base portion made of radio frequency shielding material; and
   light emitting diodes carried on said substrate and disposed to illuminate said keypads by reflecting light off of the reflective top surface of said base shielding layer.

2. The portable telecommunication device of claim 1, wherein said optically reflective top surface is made of a metal foil.

3. The portable telecommunication device of claim 1, wherein said optically reflective top surface is made of nickel foil.

4. The portable telecommunication device of claim 1, wherein said insulating bottom surface is made from either rubber or plastic.

5. The portable telecommunication device of claim 1, wherein said keypad base is made of an insulating material impregnated with metal particles.

6. The portable telecommunication device of claim 1, wherein said keypad base is made of an insulating material doped with magnesium.

7. A method for radio frequency shielding and lighting a keypad, comprising the steps of:
   disposing an optically reflective radio frequency shielding metal layer in insulated relation over a printed circuit board;
   disposing a keypad base made of radio frequency shielding material over the optically reflective metal layer;
   providing optically translucent keypads supported by said keypad base;
   providing one or more light emitting diodes in optical communication with said reflective metal layer; and
   lighting the translucent keypads with light from said light emitting diodes and reflected light from said metal layer.

8. The method of claim 7, further including the step of disposing a layer of electrically insulating material between the metal layer and a surface of the printed circuit board.

9. The method of claim 7, further including the step of disposing an electrically insulating layer of rubber or plastic between the metal layer and a surface of the printed circuit board.

10. The method of claim 7, further including the step of making said metal layer from nickel foil.

11. The method of claim 7, further including the step of making said keypad base from insulating material impregnated with metal particles.

12. The method of claim 7, further including the step of making said keypad base from insulating material doped with magnesium.

13. The method of claim 7, further including the step of grounding said metal layer and said keypad base on said printed circuit board.

* * * * *